Patented Dec. 14, 1926.

1,610,298

UNITED STATES PATENT OFFICE.

CARL PIERCE LEWIS, OF BURLINGAME, CALIFORNIA, ASSIGNOR TO MINERALS SEPARATION NORTH AMERICAN CORPORATION, OF NEW YORK, N. Y., A CORPORATION OF MARYLAND.

FROTH-FLOTATION CONCENTRATION OF ORES.

No Drawing.    Application filed April 19, 1926. Serial No. 103,171.

This invention relates to the froth-flotation concentration of ores and is herein illustrated as applied to the concentration of zinc-bearing ores containing iron.

It has been found that zinc ores, which may also carry other values such as lead, silver, or copper, can be concentrated so as to yield a zinc concentrate well above merchantable grade at a single operation, and that the zinc concentrate may carry ninety per cent or more of the zinc of the ore while most of the iron is excluded from that concentrate.

In the examples given below the ore pulp is subjected to the agitation and aeration of the froth-flotation process for the flotation of the zinc in the presence of a sulphur-containing organic compound such as a xanthate which is added to the ore pulp after sufficient lime has been added to give the pulp an alkalinity which may be just detectable by phenolphthalein. Some of the other metalliferous minerals present may be floated first, if desired. The xanthate, which is herein disclosed as a salt of xanthic acid, or part of the required xanthate, may be added for the flotation of these other minerals. In such case the lime is usually added after they have been floated, and then there is usually added a small quantity of a copper salt, such as copper sulphate, and a further quantity of xanthate, and any desired or necessary mineral-frothing agent or agents.

This procedure has been found extremely effective in separating lead and zinc, as is illustrated in a test of a silver-bearing lead-zinc ore from the United Mines Company of British Columbia. The suitably ground ore was made into a pulp with water and agitated for seven minutes in a minerals separation spitzkasten subaeration testing machine with 0.12 pound of potassium xanthate, and 0.1 pound of cresylic acid, both per ton of ore, and a lead-bearing froth was collected. Then there was added lime equivalent to 4 pounds of calcium oxide per ton of ore and the pulp agitated to disseminate the lime. This gave the pulp a detectable alkalinity. Then there was added in the order named one pound of copper sulphate, 0.15 pounds of steam distilled pine oil, and 0.1 pounds of potassium xanthate, and the agitation and aeration continued while a zinc-bearing froth was collected for seven minutes. The results are shown in the following table:

Assays.

|  | Wt. | Ag. | Pb. | Zn. | Fe. |
|---|---|---|---|---|---|
|  | Per cent | Ounces | Per cent | Per cent | Per cent |
| Heads | 100.0 | 23.1 | 8.8 | 26.8 | 6.4 |
| Pb. conc | 10.6 | 97.2 | 75.0 | 12.6 | 1.7 |
| Zn. conc | 43.5 | 24.0 | 1.1 | 56.4 | 4.3 |
| Tail | 45.9 | 5.1 | .8 | 2.0 | 9.4 |

Recoveries.

|  | Ag. | Pb. | Zn. | Fe. |
|---|---|---|---|---|
|  | Per cent | Per cent | Per cent | Per cent |
| Heads | 100.0 | 100.0 | 100.0 | 100.0 |
| Pb. conc | 44.7 | 90.3 | 5.0 | 2.8 |
| Zn. conc | 45.2 | 5.5 | 91.6 | 29.3 |
| Tail | 10.1 | 4.2 | 3.4 | 67.9 |

This procedure has been found effective in concentrating the refractory copper-zinc ores of the Afterthought and Bully Hill mines, yielding a concentrate assaying 54% of zinc with a zinc recovery of 88%.

The process has proved effective in obtaining a richer zinc concentrate relatively lower in iron than has hitherto been obtained from a refractory zinc ore (carrying iron and copper) from Gunnison county, Colorado. A pulp of the suitably ground ore was agitated in the same machine with lime equivalent to 5 pounds of calcium oxide, 1 pound of copper sulphate, 0.15 pounds of potassium xanthate, 0.1 pounds of steam-distilled pine oil, and 0.2 pounds of water gas tar, all per ton of ore, and a rougher froth concentrate collected for fifteen minutes. This rougher concentrate was reagitated without any addition of reagents for five minutes to yield a finished concentrate and a middling. The final results are shown in the following table:

|  | Assays | | | | Recoveries | | |
|---|---|---|---|---|---|---|---|
|  | Wt. | Cu. | Zn. | Fe. | Cu. | Zn. | Fe. |
|  | Per cent | Per cent | Per cent | Per cent | Per cent | Per cent | Per cent |
| Heads | 100.0 | 1.12 | 29.59 | 20.4 | 100.0 | 100.0 | 100.0 |
| Conc | 47.0 | 1.52 | 52.6 | 10.8 | 63.4 | 83.5 | 24.9 |
| Midd | 6.3 | 1.84 | 31.3 | 16.6 | 10.7 | 6.6 | 7.1 |
| Tail | 46.7 | .62 | 6.2 | 29.7 | 25.9 | 9.9 | 68.0 |

A pulp of suitably ground Silver King Coalition silver-bearing lead-zinc ore was agitated in the same machine with 0.15 pounds of potassium xanthate, 0.15 pounds of cresylic acid, 0.15 pounds of a mixture of naphthalene and xylene, all per ton of ore, and then during further agitation there was added 0.3 pounds of sodium cyanide per ton of ore, and a lead-bearing froth concentrate collected during ten minutes agitation. To the remainder of the pulp was added lime equivalent to 6 pounds of calcium oxide, 1 pound of sulphate of copper, 0.1 pound of steam distilled pine oil, 0.05 pounds of potassium xanthate, all per ton of ore, and a zinc-bearing froth concentrate collected during ten minutes agitation. To the remainder of the pulp was then added 1.5 pounds of sodium silicate, and 0.1 pound of cresylic acid, both per ton of original ore, and a silver-bearing froth concentrate collected for seven minutes. All three concentrates were of commercial grade. The lead concentrate was very rich in lead and carried most of the silver, the zinc concentrate was well above the minimum zinc content required by the smelters, and the silver concentrate was commercially valuable for its silver content although it carried most of the iron. The results are shown in detail in the following table:

*Assays.*

|  | Wt. | Ag. | Pb. | Zn. | Fe. |
|---|---|---|---|---|---|
|  | Per cent | Ounces | Per cent | Per cent | Per cent |
| Heads | 100.0 | 47.61 | 29.1 | 15.2 | 6.7 |
| Pb. conc | 41.2 | 92.6 | 67.6 | 8.0 | 1.8 |
| Zn. conc | 18.9 | 33.2 | 2.7 | 60.0 | 2.2 |
| Ag. conc | 11.8 | 17.0 | 5.0 | 4.0 | 36.0 |
| Tail | 28.1 | 4.2 | 1.0 | .2 | 4.5 |

*Recoveries.*

|  | Ag. | Pb. | Zn. | Fe. |
|---|---|---|---|---|
|  | Per cent | Per cent | Per cent | Per cent |
| Heads | 100.0 | 100.0 | 100.0 | 100.0 |
| Pb. conc | 80.1 | 95.3 | 21.5 | 11.1 |
| Zn. conc | 13.2 | 1.7 | 75.0 | 6.2 |
| Ag. conc | 4.2 | 2.0 | 3.1 | 63.8 |
| Tail | 2.5 | 1.0 | .4 | 18.9 |

Sometimes the recovery of zinc has been extraordinarily high with a large rejection of the iron. A pulp of suitably ground iron-bearing zinc ore from Virginia was agitated in the same machine with 0.1 pounds per ton of potassium xanthate, lime equivalent to 5 pounds of calcium oxide, one pound of sulphate of copper, 0.1 pounds of steam distilled pine oil, 0.2 pounds of water gas tar, all per ton of ore, and a rougher froth concentrate was collected for fifteen minutes. This rougher concentrate was re-agitated to separate it into a finished concentrate and a middling without the addition of any further agents. The results are shown in the following table:

|  | Assays | | | Recoveries | |
|---|---|---|---|---|---|
|  | Wt. | Zn. | Fe. | Zn. | Fe. |
|  | Per cent | Per cent | Per cent | Per cent | Per cent |
| Heads | 100.0 | 22.5 | 6.0 | 100.0 | 100.0 |
| Conc | 36.6 | 56.4 | 2.6 | 92.0 | 16.0 |
| Midd | 6.6 | 14.6 | 12.2 | 4.3 | 13.6 |
| Tail | 56.8 | 1.5 | 7.4 | 3.7 | 70.4 |

Having thus described certain embodiments of my invention what I claim is:

1. The process of concentrating an iron-bearing zinc ore which consists in agitating a pulp of the ore with sufficient lime to render it alkaline and with a sulphur-containing organic compound, further agitating it with a copper salt and with a mineral-frothing agent to produce a mineral-bearing froth relatively rich in zinc and poor in iron, and separating the froth.

2. The process of concentrating an iron-bearing zinc ore which consists in agitating a pulp of the ore with sufficient lime to render it alkaline and with xanthate, further agitating it with a copper salt and with a mineral-frothing agent to produce a mineral-bearing froth relatively rich in zinc and poor in iron, and separating the froth.

3. The process of concentrating an iron-bearing zinc ore also carrying another value which consists in agitating a pulp of the ore with a sulphur-containing organic compound and another agent to cause it to produce a mineral-bearing froth relatively rich in the other value, separating the froth, adding sufficient lime to render the pulp detectably alkaline, also adding a copper salt and another agent, agitating the pulp to produce a mineral-bearing froth relatively rich in zinc and poor in iron, and separating the froth.

4. The process of concentrating an iron-bearing zinc ore also carrying another value which consists in agitating a pulp of the ore with agents to cause it to produce a mineral-bearing froth relatively rich in the other value, separating the froth, adding sufficient lime to render the pulp detectably alkaline, also adding a copper salt and a sulphur-containing organic compound and another agent, agitating the pulp to produce a mineral-bearing froth relatively rich in zinc and poor in iron, and separating the froth.

5. The process of concentrating an iron-bearing zinc ore also carrying another value which consists in agitating a pulp of the ore with xanthate and another agent to cause it to produce a mineral-bearing froth relatively rich in the other value, separating the froth, adding sufficient lime to render the pulp detectably alkaline, also adding a copper salt and further xanthate and another agent, agitating the pulp to produce a mineral-bearing froth relatively rich in zinc, and separating the froth.

6. The process of concentrating an iron-bearing zinc ore also carrying silver and lead, which consists in agitating a pulp of the ore with a sulphur-containing organic compound and another agent to cause it to produce a mineral-bearing froth relatively rich in lead and poor in iron, separating the froth, adding sufficient lime to render the pulp detectably alkaline, adding a copper salt, adding further sulphur-containing organic compound, agitating to produce a mineral-bearing froth relatively rich in zinc and poor in iron, separating the froth, adding further agent, agitating to produce a mineral-bearing froth relatively rich in silver and iron, and separating the froth.

7. The process of concentrating an iron-bearing zinc ore also carrying silver and lead which consists in agitating a pulp of the ore with xanthate and another agent to cause it to produce a mineral-bearing froth relatively rich in lead and poor in iron, separating the froth, adding sufficient lime to render the pulp detectably alkaline, adding a copper salt, adding further xanthate, agitating to produce a mineral-bearing froth relatively rich in zinc and poor in iron, separating the froth, adding further agent, agitating to produce a mineral-bearing froth relatively rich in silver and iron, and separating the froth.

8. The process of concentrating a zinc ore containing also another value which consist in agitating a pulp of the ore with a sulphur-containing organic compound and with a mineral-frothing agent to produce a mineral-bearing froth relatively rich in said other value separating the froth, adding sufficient lime to render the pulp alkaline and another suitable agent, further agitating the pulp to cause it to yield a mineral-bearing froth relatively rich in zinc, and separating the froth.

9. The process of concentrating a zinc ore containing also another value which consists in agitating a pulp of the ore with xanthate and with a mineral-frothing agent to produce a mineral-bearing froth relatively rich in said other value, separating the froth, adding sufficient lime to render the pulp alkaline and another suitable agent, further agitating the pulp to cause it to yield a mineral-bearing froth relatively rich in zinc, and separating the froth.

10. The process of concentrating a zinc ore containing also another value which consists in agitating a pulp of the ore with a sulphur-containing organic compound and with a mineral-frothing agent to produce a mineral-bearing froth relatively rich in the other value, separating the froth, adding sufficient lime to render the pulp detectably alkaline, adding a copper salt and further sulphur-containing organic compound, further agitating to produce a mineral-bearing froth relatively rich in zinc, and separating the froth.

11. The process of concentrating a zinc ore containing also another value which consists in agitating a pulp of the ore with xanthate and with a mineral-frothing agent to produce a mineral-bearing froth relatively rich in the other value, separating the froth, adding sufficient lime to render the pulp detectably alkaline, adding a copper salt and further xanthate, further agitating to produce a mineral-bearing froth relatively rich in zinc, and separating the froth.

12. The process of concentrating a zinc ore also carrying silver and lead which consists in agitating a pulp of the ore with a sulphur-containing organic compound and an agent to cause it to produce a mineral-bearing froth relatively rich in lead, separating the froth, adding sufficient lime to render the pulp detectably alkaline, adding a copper salt, adding further sulphur-containing organic compound, agitating to produce a mineral-bearing froth relatively rich in zinc, separating the froth, adding further agent, agitating to produce a mineral-bearing froth relatively rich in silver, and separating the froth.

13. The process of concentrating a zinc ore also carrying silver and lead which consists in agitating a pulp of the ore with xanthate and an agent to cause it to produce a mineral-bearing froth relatively rich in lead, separating the froth, adding sufficient lime to render the pulp detectably alkaline, adding a copper salt, adding further xanthate, agitating to produce a mineral-bearing froth relatively rich in zinc, separating the froth, adding further agent, agitating to produce a mineral-bearing froth relatively rich in silver, and separating the froth.

In testimony whereof, I have affixed my signature to this specification.

CARL PIERCE LEWIS.